Patented Nov. 22, 1949

2,439,033

UNITED STATES PATENT OFFICE 2,439,033

PROCESS OF MAKING A PLASTIC HYDRATED LIME

Harry N. Huntzicker, Evanston, Ill., assignor to United States Gypsum Company, Chicago, Ill., a corporation of Illinois No Drawing. Application December 8, 1944, Serial No. 567,319

4 Claims. (Cl. 23—313)

The present invention relates to a substantially immediately plastic hydrated lime in dry form, and to processes for its production.

In the production of mortars and plastering compositions lime has been used for a great many years as the main bonding agent. Thus, various forms of limestone have been calcined in order to drive out the carbon dioxide and to yield thereby so-called burnt lime, which is calcium oxide, CaO.

Formerly it was customary for the user to take such burnt lime, often spoken of as quick lime or hot lime, and to mix it with a sufficient amount of water to combine with the calcium oxide, so as to form calcium hydroxide. This operation was commonly known as "slaking"; although a more scientific designation, and one which has become more common in recent years, is hydration. When slaking or hydrating a quick lime, the material falls into a very finely divided state which remains more or less suspended in the water, forming a dough-like or mortar-like mass, known as "lime putty." Such a putty is very plastic and the plasticity generally improves with age so that for many years it was customary to store the putty with suitable provisions to prevent loss of water by evaporation for several months, or even a year, before use.

As the building industry progressed, and the trend toward greater speed came into evidence, a demand arose for a more convenient form of lime for use in the building trades. Efforts were therefore directed by numerous inventors toward the production of a dry product which could be mixed with water and soaked for a period, usually in excess of 16 hours, to develope suitable plasticity and working qualities. When this was accomplished, it was natural that the next step would be to develope a product that did not require soaking. Many processes and patents have been published purporting to solve the problem of producing a dry product which, upon mixing with water, would become sufficiently plastic within a reasonable time, say not over an hour, so that it could be used immediately by either the mason or plasterer.

It had been found, however, that if lime were slaked or hydrated under conditions immediately productive of a dry product, such product, even through fairly completely hydrated, would not produce, upon mixing with water, a putty sufficiently plastic to meet building specifications.

Hydration of calcium oxide has usually been accomplished by the use of hydrating devices such as the Clyde, Kritzer, or Schaffer hydrators which operate in general upon the principle of mixing with comminuted quick lime a sufficient quantity of water to yield calcium hydroxide, using only such slight excess of water so that such excess will be evaporated from the mixture as a result of the temperature attained by the mixture under the effect of the heat of hydration which, in the case of lime, is quite considerable.

There are also available to the manufacturers of lime large deposits of a limestone termed "dolomitic limestone," which contains varying amounts of magnesium in the form of carbonate. When such a magnesium-containing limestone or dolomitic limestone is calcined, it will of course yield calcium oxide accompanied by magnesium oxide. When slaking magnesium-containing or dolomitic quick lime in the ordinary hydrator, such as a Clyde or Schaffer hydrator, substantially only the calcium oxide component becomes hydrated. The magnesium oxide remains practically unchanged, although under favorable conditions there might form as much as 5% of magnesium hydroxide. Various methods have been proposed to overcome this difficulty, some of these involving the hydration of magnesium-containing quick limes under superatmospheric pressure so that a higher temperature would obtain during the hydration step. This might be carried out either by hydrating both the magnesium and calcium contents of the lime at the same time in a pressure vessel or autoclave, or more conveniently the quick lime might be hydrated in a hydrator such as a Schaffer or Clyde hydrator, thereby hydrating the calcium oxide component and yielding a substantially dry-appearing pulverulent material. Such material would then be mixed with additional quantities of water sufficient to hydrate the magnesium oxide component and the hydration thereof would be accomplished in a pressure vessel.

All such methods of hydration are well known in the industry and have long been known and practiced.

It was always the object of the manufacturers to produce a dry product, so that it could be sold in paper bags. In order to assure such a product, the heat remaining in the hydrated product would be utilized to evaporate such water as was in excess of that required to furnish the OH radicals for the calcium and magnesium hydroxides. Sometimes even additional heat was used to insure the removal of excess water.

However, the products obtained when gauged with water would not be sufficiently plastic to permit of their use as a mortar ingredient or as a finishing lime except perhaps upon protracted soaking, such as soaking for twelve to twenty-four hours. Now, self-evidently, such a delay is a great handicap to the builder, and also makes it necessary to adhere to more or less rigorous schedules in conducting the building operation, as for example, mixing up the lime anywhere from twelve to twenty-four hours ahead of the time it is required to be used. Then if the schedule is disturbed, a batch of lime might actually be over-aged, and might become grainy, particularly in the case of dolomitic hydrate approximating the formula $Ca(OH)_2.MgO$, or might dry out, or might otherwise fail to be used up, with the resultant inconvenience, loss, and not to speak of the problem of disposal of a spoiled batch.

It will thus be apparent that a dry lime product which would be substantially immediately plastic upon admixture with water, would be a highly desirable and useful thing in the building materials art. Such a material is attainable as the result of the practice of the present invention.

One of the objects of the present invention therefore is to produce a substantially immediately plastic hydrated lime by a process which involves the packing or compacting thereof by flaking the hydrated lime by means of so-called flaking roll mills.

A further object of the invention is to produce a substantially immediately plastic hydrated lime in the form of small flakes derived from hydrated lime by compressing said lime into a thin and more or less coherent sheet which may then be broken up into small flakelets or fragments. For use as a hydrated finishing-lime, the product should be finely divided; in fact, Federal specifications require a degree of subdivision equal at last to 85% through a 200-mesh screen. Such a degree of fineness is, however, not necessary in case of mason's hydrated lime; but in any case, the disintegration of the flakes does not adversely affect the plasticity, usually actually producing a small improvement, as measured on an Emley plasticimeter.

A further object of the invention is to produce a substantially immediately plastic hydrated lime in the form of small flakes from a dolomitic lime which has been substantially completely hydrated, so that both the calcium oxide as well as most of the magnesium oxide will be in the form of the corresponding hydroxides, and which product is rendered plastic by putting it into the form of small flakes by passing it through a suitable roll flaking mill.

Other objects of the invention will become apparent from the further description and claims hereinbelow.

As already briefly indicated, the product of the present invention is produced by taking any suitably hydrated lime, be it either high calcium lime or dolomitic lime, or other magnesium-containing lime, sufficiently hydrated, and passing it in the dry condition between rolls at a sufficient pressure to force the small particles of the hydrated lime into such contact that they form more or less coherent but fragile flakes. The rolls used for this purpose are preferably of polished steel or may be of other suitable material, and if desired they may be slightly roughened or corrugated with corrugations running either with or across the direction of the rolls. The rolls preferably exert high pressure upon the material passing therebetween, and it has been found somewhat advantageous to have the surfaces of the rolls move at differential speeds all as more fully hereinafter described.

The rolls used for the purpose are thus commonly known as roll mills, and are of the kind which have long been used in the cereal industry for the making of cereal flakes. One may use either a single pair of rolls, rotating in opposite directions, and in close contact with each other, or at a definite, maintained distance apart, or a double pair, or triple pair, or even combinations of successive rolls, provided only that the end product will have the desired characteristics.

As an indication of the type of mills which have been found suitable, mention may be made of a number of standard mills now readily obtainable and described and illustrated in printed publications as follows:

There is, for example, the so-called Wolf Standard flaking mill, described and illustrated on page 1392 of the 1944–1945 Chemical Engineering Catalogue, 29th edition, published by Reinhold Publishing Corporation of New York, New York;

Or the Sprout Waldron roller mill, illustrated and described on page 1180 of the said Chemical Engineering Catalogue.

One might also use the so-called Nordyke double roller mill, illustrated and described in Bulletin No. 1264 of April 1936, of the Allis-Chalmers Mfg. Co. of Milwaukee, Wis.

In listing the mills described in these printed publications, it is to be understood that they are merely illustrative of the type of equipment which may successfully be used for the practice of the present invention, which invention, however, is by no means limited to the use of these particular mills. Inasmuch as these mills are widely known and well illustrated by photographs and working drawings, it is not believed necessary to accompany the present specification by formal drawings.

As already mentioned, the particular method of hydration of the lime is of no great importance, although a preferred embodiment of the present invention employs a substantially completely hydrated dolomitic lime which is made about as follows:

The limestone is calcined in the ordinary way in either a shaft or rotary calciner, and then crushed to pieces, say not larger than ¼″, that is to say, pieces which will pass through a ¼″ mesh. This lime is then hydrated as, for example, in a Schaffer hydrator using a slight excess of water, which excess, however, usually evaporates during and following the hydration.

If the lime has been a high calcium lime, it would now be immediately ready for the important inventive step of the present invention. If, however, it is a magnesium-containing lime or a dolomitic lime, the magnesium oxide content should be hydrated. This may be successfully accomplished by mixing the Schaffer hydrate with a sufficient quantity of water to hydrate the magnesium oxide content, using a slight excess of water to insure that enough is present. The mixture of hydrated lime and water is confined in an autoclave or other suitable pressure vessel into which, after suitable sealing, steam is injected to initiate the hydration of the magnesium oxide. The steam is preferably admitted until about 50 pounds pressure (gauge) is reached, after which the hydration thus initiated continues. As this is an exothermic reaction, the temperature and pressure in the apparatus rises and preferably is allowed to rise to about 150 pounds per square inch or higher. When the hydration is completed, a small additional amount of water may be injected, as a test for the completeness of the hydration. If some of the magnesium oxide is still uncombined, a slight further rise in temperature and pressure will become evident. Usually, however, the exact composition of the lime has been ascertained by the control laboratory, and therefore the right amount of water has been employed. In any event, it is found that when operating under these conditions at least about 90% of the magnesium oxide has been converted into the corresponding hydroxide.

When the hydration is completed, the pressure in the autoclave is rapidly reduced by opening a suitable discharge valve so that the steam may escape, whereafter the contents are removed and passed through a suitable aerating device such as for example an open screw conveyor whereby any residual uncombined water becomes rapidly evaporated by the inherent heat of the material. It is desired to leave not more than about ½% of moisture in the material. At that stage it is in the form of substantially impalpable powder. This powder, when mixed with water, will produce a putty which, however, has only a rather low plasticity, far below that required by the industry.

It might be convenient at this point to mention the methods employed for measuring both the consistency and plasticity of these products. Consistency is sometimes known as the Vicat consistency, and the plasticity is that measured on the Emley plasticimeter. The preferred methods are those described in the volume entitled A. S. T. M. Standards, part II—1939, page 910, under the designation C110–38T, issued 1934; revised 1938; this being the publication of the American Society for Testing Materials.

In making the tests hereinbelow described, the hydrated lime products were soaked about fifteen minutes, and were tested almost immediately thereafter, but in any event none of them had aged more than one hour from the time they were mixed until the time they were tested. This applies both to the consistency as well as the plasticity figures. The minimum plasticity for the successful use of the products is considered to be about 200. Most of the so-called plastic lime sold on the American market today as finishing-lime is required under Federal specifications, A. S. T. M. specifications, and many building codes, to have a plasticity of at least 200.

In practicing the flaking operation, the dry lime hydrate, containing say not over ½% moisture, is fed to the flaking roll or rolls and passed therebetween under sufficient pressure to force the pulverulent material into what to the eye appears as a more or less adherent sheet which continually issues from the far side of the rolls. This sheet, however, is very fragile and almost immediately breaks up into small flakes which, however, may vary anywhere from $\frac{1}{16}$" to 2½" in diameter. Their thickness is about that of an ordinary sheet of writing paper. The product could be sold in the form of these flakes, but because it is not uniform in appearance, it therefore might not be as attractive to the trade as might otherwise be the case. The process also involves a disintegration of these flakes into smaller particles, for example, of such size that will pass through a 30-mesh screen; although they can be divided more finely, depending upon the intended use and requirements placed on the product. This disintegration of the flakes may be accomplished in a number of ways:

(a) By putting the product of the roll mill through an impact mill, such for example as a hammer mill;

(b) By putting it through an air separator, and feeding the tailings thereof through an impact mill, thereafter combining the fines from the separator and the discharge from the impact mill;

(c) Grinding the flakes in an attrition mill; or any other kind of mill such as has been used in the lime industry for fine grinding.

The object is again to break up the flakes into smaller particles, so that the product will have a uniform appearance. Such reduction in size of the flaky particles does not adversely affect the developed plasticity of the product.

As examples of actual operations the following are given:

*Example I.*—A substantially completely hydrated dolomitic lime which before subjecting it to the flaking process of the present invention had a consistency of 97 c. c. and a plasticity of 139, was passed between the rolls of a mill. The rolls were 6" in diameter, and were running at a rate of 510 R. P. M., both rolls running at the same speed and of course in opposite directions. They were set as close as possible so that a high pressure would be exerted upon the pulverulent lime passing therebetween. The flakes obtained varied in diameter from $\frac{1}{16}$ to ¼ inch, and they were gently rubbed through a 50-mesh screen so that the product would consist of flakelets no greater than 50-mesh in size. When testing this product it was found to have a consistency of 93 c. c. and a plasticity of 200.

*Example II.*—The same raw material was used for this test as had been used in Example I, except that the rolls were now so operated that one roll was revolving at 510 R. P. M. while the second roll was revolving two and one-half times as fast, or therefore at 1275 R. P. M. The flakes obtained were substantially the same as in Example I, and after rubbing through a 50-mesh screen, the product was found to have a Vicat consistency of 95 c. c. and a plasticity of 290. It therefore appears that having rolls operate at differential speeds is advantageous although not absolutely essential.

*Example III.*—Again, using the same raw material and the same mill except that the rolls were operated at a differential of one and one-half to one (i. e. 510 R. P. M. and 765 R. P. M. respectively) other conditions being the same as in Examples I and II, the product had a consistency of 92 c. c. and plasticity of 215.

*Example IV.*—A different raw material was used for this example, namely a completely hydrated dolomitic lime having a Vicat consistency of 104 c. c. and a plasticity of 157. This was passed through a roll mill in which the rolls had a diameter of 5", one roll running at 68½ R. P. M. and the second roll at 137 R. P. M., the mill used being what is sometimes known as a paint mill. The product issuing from the far side of the rolls was practically in the form of a sheet which, however, immediately broke up into flakes which had a diameter of from 2" to 3". These flakes were then further broken up and then air separated. Upon testing it was found to have a Vicat consistency of 97.5 c. c. and a plasticity of 270.

When some of the flakes were tested without air separation, they were found to have a Vicat consistency of 92.5 c. c. and a plasticity of 315. It should be noted that these tests were all made after only a fifteen minute soak, thus showing the substantially immediate high plasticity of the product.

*Example V.*—This example was exactly the same as Example IV, except that the flakes produced were returned to the mill and run through a second time. The product obtained, without air separation of sieving, had a Vicat consistency of 92 c. c. and a plasticity of 385. This is exemplary of what can be accomplished with a multiple roll mill. When disintegrated in an air separator it had a Vicat consistency of 96 c. c. and a plasticity of 352.

*Example VI.*—For this example a high calcium lime was employed which had merely been hydrated in a Clyde hydrator. The product before running through the mill had a Vicat consistency of 104.5 c. c. and a plasticity of 109 (both after a 15 minute soak). After running through the mill and air separating it had a Vicat consistency of 99 c. c. and a plasticity of 149 (15 minute soak). It will be seen that the plasticity of the high calcium limes is inherently not as high as that of the dolomitic limes, but the plasticizing effect of the flaking operation is clearly manifest.

*Example VII.*—For this example there was used a Schaffer-hydrated dolomitic lime. This product therefore still contained substantially all of the magnesium oxide in the unhydrated condition. Such a lime, however, is very widely used for many purposes and represents a large bulk of the lime used in the United States. Before subjecting it to the plasticizing treatment of the present invention, it was found to have a Vicat consistency of 96 c. c. and a plasticity of 103. After putting this product through the mill described in connection with Example IV, and then air separating and mixing with water, and soaking fifteen minutes, the product had a Vicat consistency of 91 c. c. and a plasticity of 195.

On the other hand, if the product was tested just as it came from the mill, but without air separation, it had a Vicat consistency of 90.5 c. c. and a plasticity of 205.

In general it is desirable to carry out the operation before the hydrate has had a chance to absorb too much moisture from the air. It has been found advantageous to have a small amount of moisture present, but this, generally speaking, should not exceed about ½%. It was also found that in the operation the mills would tend to increase in temperature due of course to the friction. It is not desirable to let the temperature of the rolls exceed about 250° F., and therefore suitable provisions are preferably made to control the temperature of the rolls. This may be accomplished by using hollow rolls through which a heating or cooling medium, such as water and/or steam may be passed. Thus it may be advantageous, when first starting up the mill, to heat the rolls and, later, as the mill gets into operation, to cool the rolls in order to maintain the operating condition in a desirable temperature range. Such temperature control of the flaking operation is considered as one of the features of the present invention.

The methods of disintegrating the flakes or sheets is more or less a matter of indifference, and the operator may suit his own tastes as to the choice of the instrumentality used for such disintegration. In fact, any mill available in any lime plant, and which can be used for grinding hydrated lime, may be adapted to this stage of the present invention. The important and essential feature of the invention lies in the plasticizing effects obtained by passing the hydrated lime between the two surfaces of a pair of rolls under pressure.

While the roll mills have been described as the preferred means for producing the flakes, it will be evident that other mechanical equivalents might be employed provided that they produced a flake of substantially uniform density. Processes which will produce agglomerated products varying in density are not considered the equivalents of the present process. For instance, the use of a ball or tube mill, while it has been described as a means for inducing plasticity in limes and other plasters, will not produce the results of the present invention, primarily because such ball or tube mills, by reason of the sudden and uncontrolled impact of the balls upon each other and upon the hydrated lime therebetween, tend to produce agglomerated particles which have a greater density at the center and very much lesser density on the outer fringes of whatever agglomerates might be produced, with the result that there is always a certain gradation through the product which interferes with the development of the desired plasticity and smoothness thereof. Agglomerates produced by ball or tube milling may develop hard centers or cores, which resist subsequent disintegration. Material thus extremely compacted does not contribute to the plasticity of the product. As a possible alternative one might place a thin layer of lime on the platen of a hydraulic press and then close the press and subject such a layer to high pressure to consolidate it into a more or less coherent sheet which may then be broken up into flakes. Such an operation is of course mechanically somewhat cumbersome, but is to be considered as within the scope of the present invention, so far as the production of the product is concerned.

Summarizing the invention therefore it comprises a reagglomeration of the fine particles of a hydrated lime product, be it either derived from a high-calcium lime, a magnesium-containing lime, or a dolomitic lime, into flakes of more or less uniform density, which flakes are then disintegrated.

Despite the fact that the product may be of a flaky appearance, dependent upon the degree of subsequent comminution, these flakes substantially immediately disappear when the product is mixed with water, and within a few minutes, say from 15 minutes to an hour, the product will already exhibit a plasticity which is well above the minimum requirements and corresponds to a considerable extent to the plasticity of slaked quick lime putties.

The manufacturer therefore is given, by means of the present invention, a quick and inexpensive process for the production of a very desirable product, namely a substantially immediately plastic hydrated lime.

Accordingly, what is claimed as being inventive herein

1. Process of making a substantially immediately plastic hydrated lime which comprises applying sufficient pressure to a thin layer of finely divided impalpably powdered substantially dry hydrated lime to agglomerate it into the form of thin sheet-like forms so as to impart thereto a plasticity of more than 200, and disintegrating said forms.

2. Process of making a substantially immediately plastic hydrated lime which comprises strongly compressing a thin layer of finely divided impalpably powdered substantially dry hydrated lime between and by means of cylindrical moving surfaces to eventuate a mass of flake-like particles so as to impart thereto a plasticity of more than 200, and disintegrating said particles.

3. Process of making a substantially immediately plastic hydrated lime which comprises strongly compressing a thin layer of finely divided impalpably powdered substantially dry hydrated lime between and by means of cylindrical moving surfaces moving at different speeds to eventuate a mass of flake-like particles so as to impart thereto a plasticity of more than 200, and disintegrating said particles.

4. Process of increasing the plasticity of finely divided impalpably powdered substantially dry hydrated lime which comprises passing and compressing the same in the form of a thin layer of fine powder between rolls rotating at different speeds at such spacing and exerting such pressure on the particles of lime that they are agglomerated into flake-like form and so as to impart thereto a plasticity of more than 200.

HARRY N. HUNTZICKER.

REFERENCES CITED

The following references are of record in the file of this patent:

UNITED STATES PATENTS

| Number | Name | Date |
| --- | --- | --- |
| 1,462,284 | Hermann | July 17, 1923 |
| 1,613,341 | Carson | Jan. 4, 1927 |
| 2,164,986 | Cox et al. | July 4, 1939 |

FOREIGN PATENTS

| Number | Country | Date |
| --- | --- | --- |
| 327,979 | Great Britain | Apr. 4, 1930 |

Certificate of Correction

Patent No. 2,489,033                                                    November 22, 1949

HARRY N. HUNTZICKER

It is hereby certified that errors appear in the printed specification of the above numbered patent requiring correction as follows:

Column 2, line 46, after the word and comma "product," insert *therefore,*; column 3, line 39, for "last" read *least*; column 7, line 10, for "of sieving" read *or sieving*; column 8, line 67, after "herein" insert *is:*;

and that the said Letters Patent should be read with these corrections therein that the same may conform to the record of the case in the Patent Office.

Signed and sealed this 4th day of April, A. D. 1950.

[SEAL]

THOMAS F. MURPHY,
                                                           *Assistant Commissioner of Patents.*